United States Patent [19]

McCormick

[11] Patent Number: 5,404,965
[45] Date of Patent: Apr. 11, 1995

[54] APPARATUS FOR LUBRICATING PIPE JOINTS

[76] Inventor: Gary J. McCormick, 3215 - 108A St., Edmonton, Alberta, Canada, T6J 3E1

[21] Appl. No.: 257,919

[22] Filed: Jun. 10, 1994

[51] Int. Cl.$^6$ .............................................. F01M 9/12
[52] U.S. Cl. .................................. 184/14; 184/105.3; 184/109; 138/96 T; 118/317; 118/DIG. 10
[58] Field of Search ........................ 184/5.1, 105.1, 14, 184/109, 105.3; 138/96 T; 118/317, DIG. 10; 29/458

[56] References Cited

U.S. PATENT DOCUMENTS

| | | | |
|---|---|---|---|
| 2,246,874 | 6/1941 | Burge et al. | 222/108 |
| 2,642,034 | 6/1953 | Griffin et al. | 118/317 |
| 4,199,858 | 4/1980 | Meijs | 29/458 |
| 4,372,245 | 2/1983 | Watson et al. | 118/56 |
| 5,141,774 | 8/1992 | Prittinen | 118/317 |

*Primary Examiner*—Thomas E. Denion

[57] ABSTRACT

An apparatus for lubricating pipe joints is described which includes a generally cylindrical plug adapted to fit into a female box connection of a length of pipe. The plug has a first end, a second end, a circumferential exterior surface and a blind interior bore which extends through the first end and terminates short of the second end. The exterior surface has a network of channels. A plurality of lubrication passages extend through the plug from the blind interior bore to the network of channels on the exterior surface. When lubrication compounds are pumped under pressure into the blind interior bore, the lubrication compounds pass through the lubrication passages into the network of channels on the exterior surface of the plug thereby thoroughly coating the female box connection with lubricant. An end cap covers the first end of the plug. The end cap has a flange that extends beyond the circumferential exterior surface. That portion of the flange which extends beyond the circumferential exterior surface has a lubricating collecting peripheral ring groove. At least one of the first end of the plug and the end cap has a plurality of radially extending channels. When lubrication compounds are pumped under pressure into the blind interior bore, the lubrication compounds pass through the radially extending channels into the peripheral ring groove of the end cap thereby thoroughly coating an annular shoulder of the female box connection with lubricant.

3 Claims, 3 Drawing Sheets

APPARATUS FOR LUBRICATING PIPE JOINTS

BACKGROUND OF THE INVENTION

An example of where an apparatus for lubricating pipe joints is used is in the field of earth drilling, especially for the petroleum industry. During earth drilling operations drilling fluids, commonly referred to as "drilling mud", are pumped down an annulus of a plurality of joined sections of drill pipe forming a drill string. Since the drilling mud is pumped at high pressure, each joint in the drill string must be perfectly sealed to prevent leakage. Leakage results in a washing action that can severely weaken the joint and cause it to fail. If the joint should fail, all that portion of the drill string below the failed joint is dropped down the borehole, and must be fished out at great expense.

Each joint has a male to female form of threaded connection. In order to prevent the joints from leaking they are screwed together under high torque. Two pieces of steel under pressure will not slide without tearing at each other and causing what is termed as "galling". Lubricating compounds form a thin gasket between the two pieces of steel forming the joint, which has a much lower sheer strength than steel. When the joint is made up the presence of the lubricating compound prevents metal to metal contact. When the joint is disassembled the lubricating compound is sheered, rather than the steel.

An apparatus for lubricating pipe joints which is presently in use has a generally cylindrical plug adapted to fit into a female box connection of a length of drill pipe. The plug has an exterior surface and a blind interior bore. A plurality of lubrication passages extend from the blind interior bore to the exterior surface of the plug. The exterior surface has a network of channels communicating with the lubrication passages. In operation, lubrication compounds are pumped under pressure into the blind interior bore. The lubrication compounds pass from the blind interior bore, through the lubrication passages and along the network of channels to thoroughly coat the exterior surface of the plug and, hence, the female box connection with lubricant.

The most important part of each connection is the mating shoulders. A weakness in apparatus used for lubricating pipe joints is that they cannot lubricate this critical portion of the joint. Of necessity the shoulders have been lubricated manually. This procedure is time consuming. Frequently, insufficient care is taken in the manual lubrication procedure and the lubrication proves to be inadequate.

SUMMARY OF THE INVENTION

What is required is an apparatus for lubricating pipe joints that is capable of lubricating the shoulders portion of the joint.

According to the present invention there is provided an apparatus for lubricating pipe joints which includes a generally cylindrical plug adapted to fit into a female box connection of a length of pipe. The plug has a first end, a second end, a circumferential exterior surface and a blind interior bore which extends through the first end and terminates short of the second end. The exterior surface has a network of channels. A plurality of lubrication passages extend through the plug from the blind interior bore to the network of channels on the exterior surface. When lubrication compounds are pumped under pressure into the blind interior bore, the lubrication compounds pass through the lubrication passages into the network of channels on the exterior surface of the plug thereby thoroughly coating the female box connection with lubricant. An end cap covers the first end of the plug. The end cap has a flange that extends beyond the circumferential exterior surface. That portion of the flange which extends beyond the circumferential exterior surface has a lubricating collecting peripheral ring groove. At least one of the first end of the plug and the end cap has a plurality of radially extending channels. When lubrication compounds are pumped under pressure into the blind interior bore, the lubrication compounds pass through the radially extending channels into the peripheral ring groove of the end cap thereby thoroughly coating an annular shoulder of the female box connection with lubricant.

Although beneficial results may be obtained through the use of the apparatus, as described above, often the length of pipe has just been pulled from a borehole and is filled with drilling fluids. Even more beneficial results may, therefore, be obtained when flow-through vents extend through the plug and end cap thereby permitting an escape of drilling fluids from the length of pipe.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
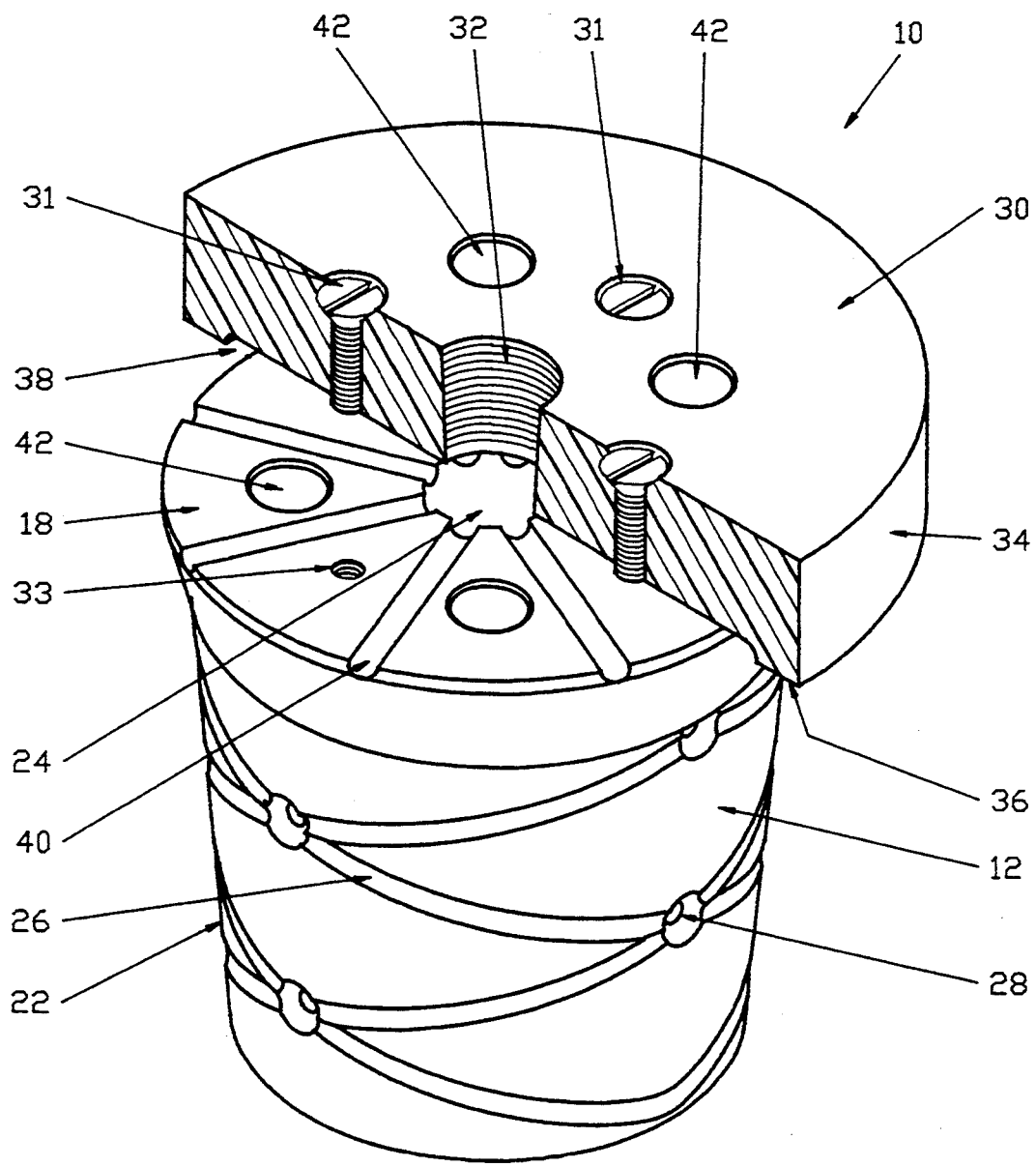
FIG. 1 is a partially cut away perspective view of an apparatus for lubricating pipe joints constructed in accordance with the teachings of the present invention.
Figure 2:
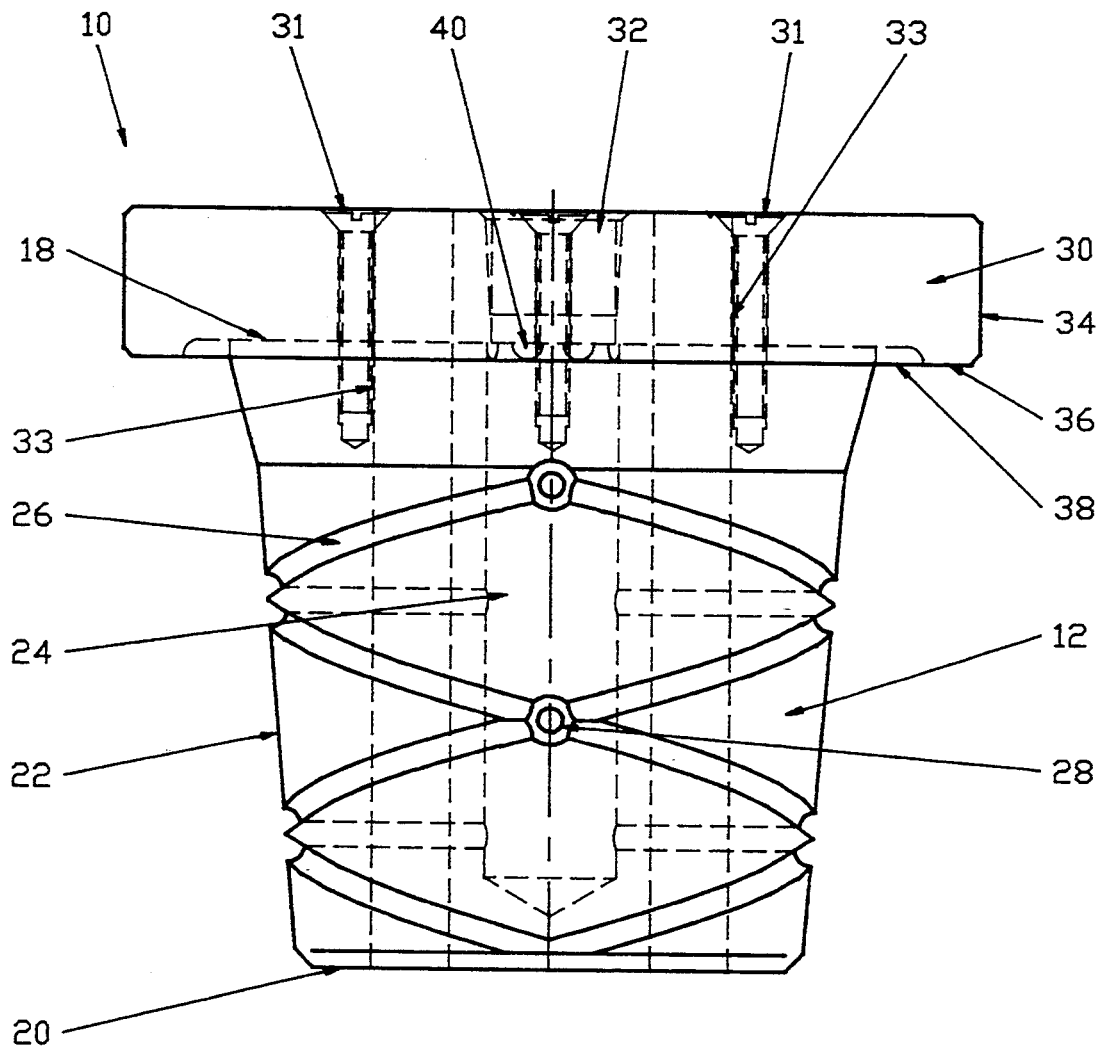
FIG. 2 is a side elevation view of the apparatus for lubricating pipe joints illustrated in FIG. 1.
Figure 3:
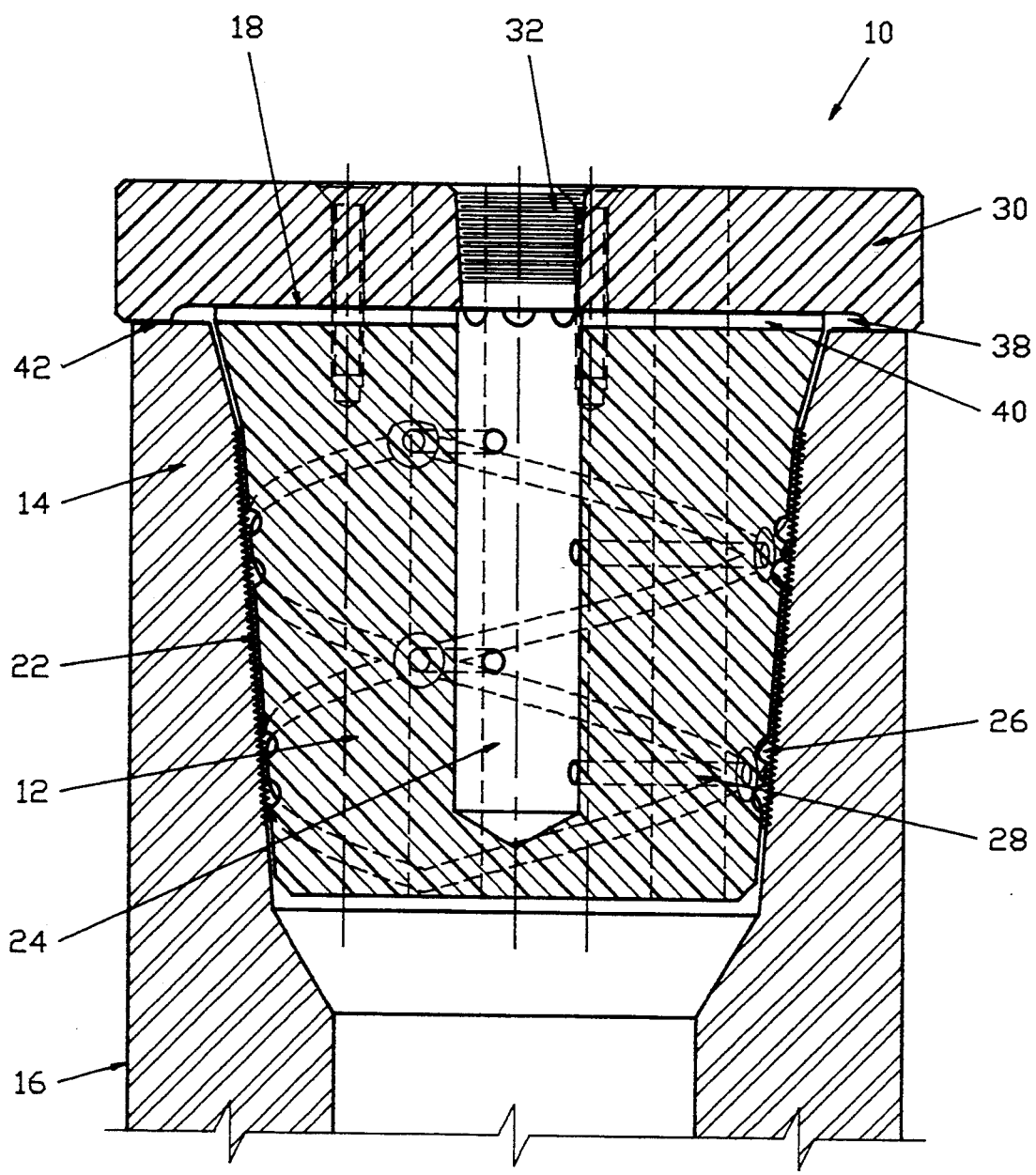
FIG. 3 is a side elevation view in section of the apparatus for lubricating pipe joints illustrated in FIG. 1, in position in a female box connection of a length of pipe.

The preferred embodiment, an apparatus for lubricating pipe joints generally identified by reference numeral 10, will now be described with reference to FIGS. 1 through 3.

Apparatus 10 includes a generally cylindrical plug 12. As best illustrated in FIG. 3, plug 12 is adapted to fit into a female box connection 14 of a length of pipe 16. Referring to FIGS. 1 and 2, plug 12 has a first end 18, a second end 20, a circumferential exterior surface 22 and a blind interior bore 24 which extends through first end 18 and terminates short of second end 20. Exterior surface 22 has a network of channels 26. A plurality of lubrication passages 28 extend through plug 12 from blind interior bore 24 to network of channels 26 on exterior circumferential surface 22. An end cap 30 covers first end 18 of plug 12. End cap 30 is held in place by a plurality of screws 31 which engage threaded openings 33 in first end 18 of plug 12. End cap 30 has a bore 32 that is axially aligned with blind interior bore 24 and a flange 34 that extends beyond circumferential exterior surface 22. That portion of flange 34 which extends beyond circumferential exterior surface 22, generally identified by reference numeral 36, has a lubricant collecting peripheral ring groove 38. First end 18 of plug 12 has a plurality of radially extending channels 40. Flow-through vents 42 extend through both plug 12 and end cap 30, the purpose of which will hereinafter be described in relation to use and operation.

The use and operation of apparatus for lubricating pipe joints 10 will now be described with reference to FIGS. 1 through 3. Referring to FIG. 3, when lubrication compounds are pumped under pressure into blind interior bore 24, the lubrication compounds pass through lubrication passages 28 into network of channels 26 on exterior circumferential surface 22 of plug 12. The flow of lubrication compounds into network of channels 26 thoroughly coats female box connection 14 with lubricant. Similarly, when lubrication compounds are pumped under pressure into blind interior bore 24, the lubrication compounds pass through the radially extending channels 40 in first end 18 of plug 12 into peripheral ring groove 38 of end cap 30. The flow of lubrication compounds into ring groove 38 thoroughly coats an annular shoulder 42 of female box connection 14 with lubricant. Should length of pipe 16 contain drilling fluids, flow-through vents 42 permit an escape of drilling fluids from length of pipe 16.

It will be apparent to one skilled in the art that modifications may be made to the illustrated embodiment without departing from the spirit and scope of the invention as defined by the claims. In particular, it will be apparent that radially extending channels 40 could be positioned in end cap 30, rather than plug 12.

THE EMBODIMENTS OF THE INVENTION IN WHICH AN EXCLUSIVE PROPERTY OR PRIVILEGE IS CLAIMED ARE AS FOLLOWS:

1. An apparatus for lubricating pipe joints, comprising:
  a generally cylindrical plug adapted to fit into a female box connection of a length of pipe, the plug having a first end, a second end, a circumferential exterior surface and a blind interior bore which extends through the first end and terminates short of the second end, the exterior surface having a network of channels;
  a plurality of lubrication passages extending through the plug from the blind interior bore to the network of channels on the exterior surface, such that when lubrication compounds are pumped under pressure into the blind interior bore, the lubrication compounds pass through the lubrication passages into the network of channels on the exterior surface of the plug thereby thoroughly coating the female box connection with lubricant;
  an end cap covering the first end of the plug, the end cap having a flange that extends beyond the circumferential exterior surface, that portion of the flange which extends beyond the circumferential exterior surface having a lubricating collecting peripheral ring groove; and
  at least one of the first end of the plug and the end cap having a plurality of radially extending channels, such that when lubrication compounds are pumped under pressure into the blind interior bore, the lubrication compounds pass through the radially extending channels into the peripheral ring groove of the end cap thereby thoroughly coating an annular shoulder of the female box connection with lubricant.

2. The apparatus for lubricating pipe joints, as defined in claim 1, wherein flow-through vents extend through the plug and end cap thereby permitting an escape of drilling fluids from the length of pipe.

3. A method for lubricating an annular shoulder of a female box connection of a length of pipe, comprising the steps of:
  firstly, inserting a generally cylindrical plug into a female box connection, the plug having a blind interior bore, a circumferential exterior surface and a flange at a first end that extends beyond the circumferential exterior surface, the plug being inserted into the female box connection until the flange engages the annular shoulder positioned on the end of the female box connection, that portion of the flange which extends beyond the circumferential exterior surface having a lubricant collecting peripheral ring groove and one of the first end of the plug and the end cap having a plurality of radially extending channels that communicate with the blind interior bore; and
  secondly, pumping lubrication compounds under pressure into the blind interior bore until the lubrication compounds pass through the radially extending channels into the peripheral ring groove of the end cap thereby thoroughly coating the annular shoulder of the female box connection with lubricant.

* * * * *